United States Patent [19]
Lemley

[11] Patent Number: 5,215,040
[45] Date of Patent: Jun. 1, 1993

[54] BIRD FEEDER SYSTEM FOR ATTRACTING MULTIPLE BIRD SPECIES

[76] Inventor: J. Merle Lemley, 304 W. Main St., Russellville, Ark. 72801

[21] Appl. No.: 847,938

[22] Filed: Mar. 6, 1992

[51] Int. Cl.⁵ .............................................. A01K 39/01
[52] U.S. Cl. .................... 119/57.9; 119/57.8; 119/52.3
[58] Field of Search .................... 119/57.8, 57.9, 51.01, 119/61, 52.2, 52.3; D30/124, 125, 126, 127, 128

[56] References Cited

U.S. PATENT DOCUMENTS

| | | | |
|---|---|---|---|
| D. 191,518 | 10/1961 | Olson | D31/2 |
| D. 205,896 | 10/1966 | Soderlind | D31/2 |
| D. 245,349 | 8/1977 | Fisher, Jr. | D30/15 |
| 1,749,497 | 3/1930 | McGlashan | |
| 2,316,463 | 4/1943 | Skulina | 119/57.8 |
| 3,151,600 | 10/1964 | Crouch | 119/51 |
| 3,664,304 | 5/1972 | Carter | 119/61 |
| 4,323,035 | 4/1982 | Piltch | 119/51 R |
| 4,441,457 | 4/1984 | Sanford | 119/57.9 |
| 4,986,219 | 1/1991 | Harris | 119/57.8 |
| 5,040,491 | 8/1991 | Yancy | 119/57.8 |
| 5,105,765 | 4/1992 | Loken | 119/52.3 |

FOREIGN PATENT DOCUMENTS

2209456 9/1987 United Kingdom .

Primary Examiner—John G. Weiss
Attorney, Agent, or Firm—Shlesinger, Arkwright & Garvey

[57] ABSTRACT

Bird feeder system for attracting and feeding a variety of species of birds at the same time includes an elongated support to which at least two bird feeders are attached. A spacing member keeps adjacent bird feeders at a predetermined fixed distance apart. The predetermined distance is selected so that incompatible species of birds can feed concurrently at adjacent feeders. In addition, the elongated support is configured for preventing non-bird species, such as rodents, from gaining access to the bird feed in the feeders.

19 Claims, 2 Drawing Sheets

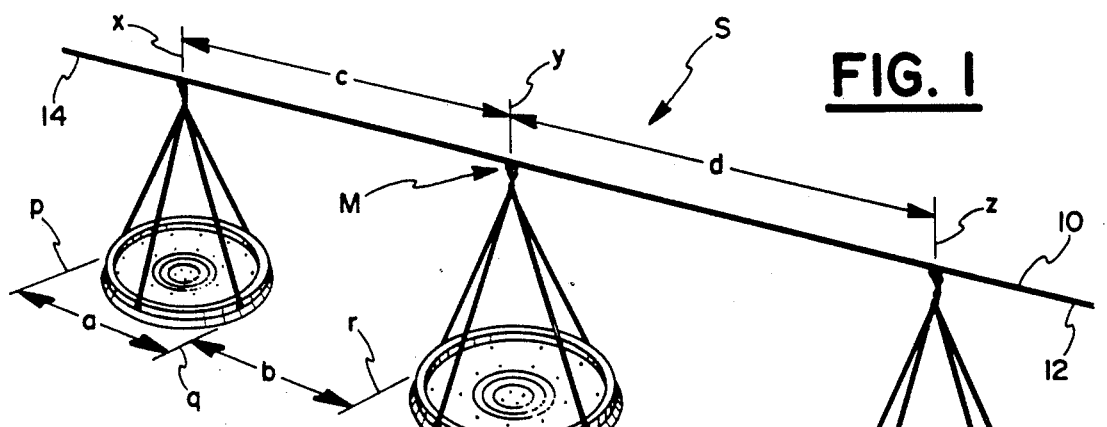
FIG. 1
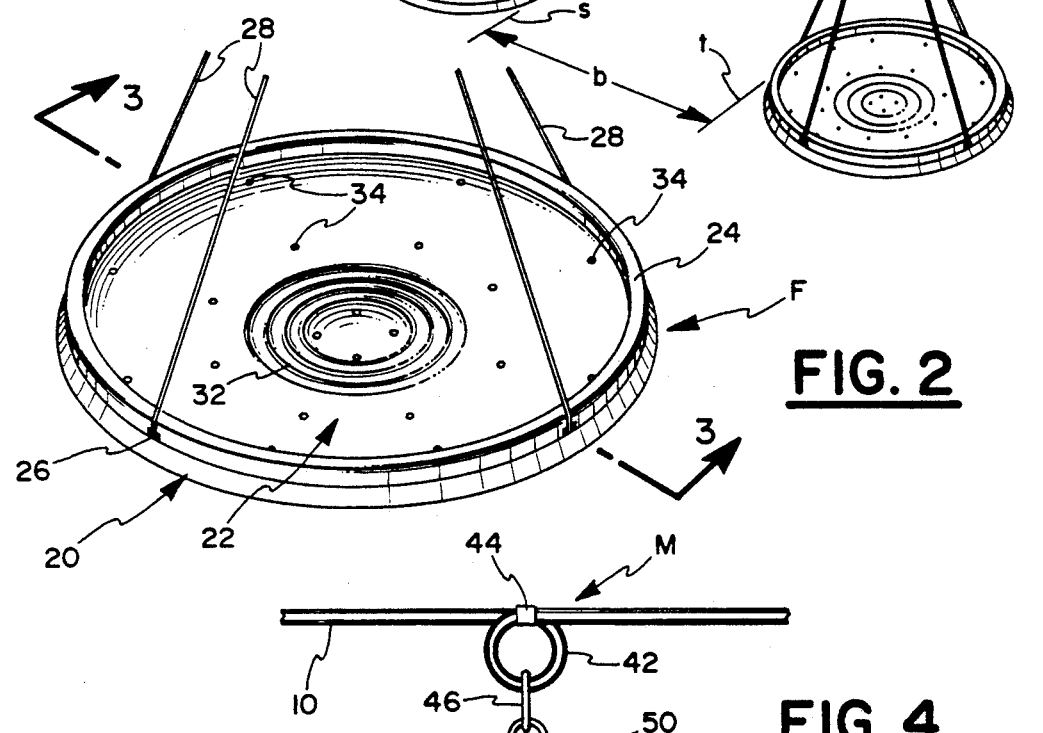
FIG. 2
FIG. 4
FIG. 3

FIG. 5
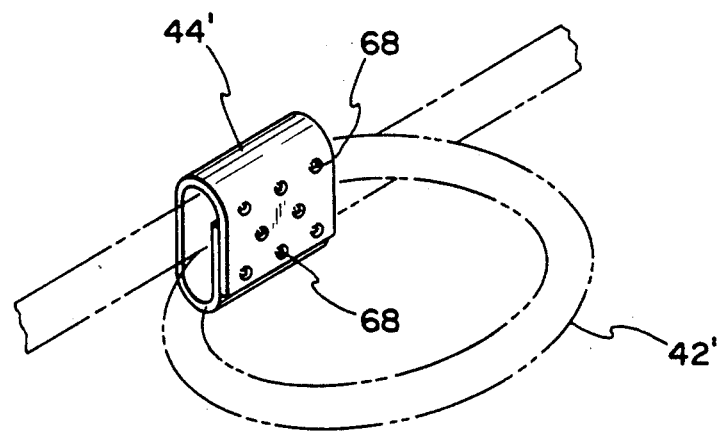
FIG. 6 - (Prior Art)
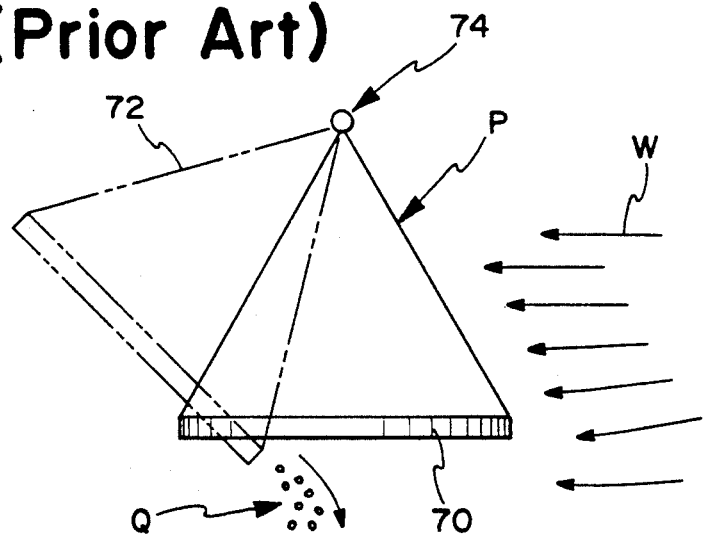
FIG. 7
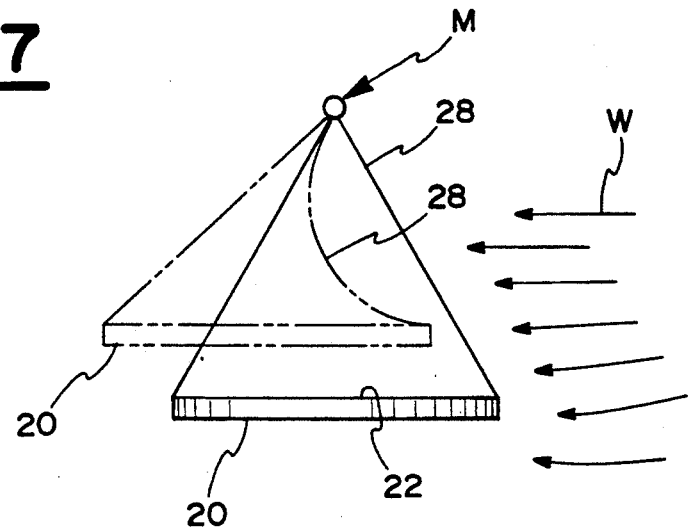

BIRD FEEDER SYSTEM FOR ATTRACTING MULTIPLE BIRD SPECIES

FIELD AND HISTORICAL BACKGROUND OF THE INVENTION

The present invention is directed to a bird feeder system for attracting and feeding a variety of birds at the same time. In addition, the bird feeder system of the present invention prevents non-bird species from gaining access to the bird food placed in the system for attracting birds.

For hundreds of years bird watching enthusiasts and inventors have been concerned with the problem of supplying bird food to attract birds without one species of birds dominating the area at which bird food is provided. For example, if only one bird feeder is used, then relatively large birds, such as blue jays, prevent smaller birds, such as chickadees, from feeding at the bird feeder. The large birds prevent the smaller birds from eating at the same time, owing to the large birds driving off the smaller birds, or by intimidating the small birds and discouraging them from approaching the bird feeder merely by the presence of the large birds at the feeder. Another long-felt problem, for which there has been heretofore no adequate solution, is the problem of rodents, such as squirrels and rats, eating the bird food directly from the bird feeder and/or eating bird food knocked from the bird feeder onto the ground from which such rodents even more easily feed.

There have been attempts in the prior art to overcome these dual problems of attracting and feeding different species of birds at the same time, while discouraging rodents from eating the bird food provided therefor.

One example of these prior attempts at feeding several species of birds concurrently at one feeder, is found in U.S. Pat. No. 4,986,219 to Harris. In the Harris device, a long, thin trough for receiving bird feed therein is provided so that many birds of several species and size ranges all can feed together with sufficient "elbow room" to avoid interspecies conflict. The long, thin trough for holding bird food disclosed in Harris is made up of subelements which encircle a central support post and from which the trough is loosely suspended. Drawbacks of the Harris device include that the construction of the narrow, multi-element feeding trough is relatively complicated, there is no physical separation between the difference parts of the feeding trough on which different specie of birds are intended to feed, and the feeding trough is intentionally loosely supported so that any bird landing on one part of the elongated feeding trough necessarily moves the entire trough. Although this feature achieves the Harris goal of providing a bird feeder having "dynamic action" for enhancing the bird watchers viewing pleasure, such movement is believed to frighten away the birds feeding on the trough when a new bird lands, and, hence, moves the surface on which the feeding birds are sitting. In the Harris patent it was recognized that sometimes small birds such as chickadees and tufted titmice would have to perch on the element which support the elongated trough while waiting for larger birds to leave the feeding trough. Thus, small birds frustrated in an initial attempt to use the Harris device may be, effectively, driven off to find an alternative non-competitive food source.

A further attempt at luring a variety of species of birds to one feeding site is found in U.S. Pat. No. 1,749,497 to McGlashan, in which multiple feeding pans are fixedly spaced one above another, and the entire array of vertically spaced feeding pans is suspended from a bracket. The McGlashan bird lure has one of the same drawbacks as in the above-described Harris device, in that a large bird landing on any one of the vertically spaced feeding pans will necessarily cause the other feeding pans to move, thereby frightening off the birds which had been sitting and feeding at the other pans.

There have likewise been attempts to prevent rodents from eating the feed placed on bird feeders. For example, in printed United Kingdom Patent Application GB 2 209 456 to MacKereth, a bird feeder protector is disclosed in which a bird feeder is hung above the ground from an elongated suspension line attached at each of its two ends to support members. There are smooth, light weight, rigid discs having holes through the central axes thereof, and through which the suspension line travels, so that each of the smooth discs can be threaded onto the suspension line and placed between the centrally located bird feeder hanging from the middle of the suspension line and the ends of the suspension line attached to the support members. The smooth discs extend transversely from and rotate relative to the suspension line. In this manner, animals attempting to gain access to the centrally suspended bird feeder progressively lose sight of the bird feeder as they crawl along the suspension line while the smooth, rotatable discs afford the additional protective benefit of being difficult to climb over or otherwise move past owing to their rotatability and smoothness.

None of these above-described devices, nor any other known conventional devices, have proven to be a completely reliable system for accommodating a variety of species of birds feeding at the same time, while also preventing rodents from having access to the bird food.

Therefore, there is a need in the art for a bird feeder system which provides for the concurrent feeding of a variety of birds species, while also preventing rodents from eating the bird food provided for attracting birds.

OBJECTS AND SUMMARY OF THE INVENTION

A primary object of the invention is to provide a bird feeder system which can feed different species of birds all at the same time.

Another object of the invention is to provide a bird feeder system which is capable of preventing rodents and other undesirable animals from eating the bird feed intended for attracting and feeding birds.

Yet another object of the invention is to provide a bird feeding system which can be readily assembled by the user, which has relatively few parts, and, hence, has enhanced reliability, and which is inexpensive to manufacture and to assemble.

A still further object of the invention is to provide a bird feeding system in which no birds must wait while other, larger birds feed.

Yet another object of the invention is to provide individual bird feeders which retain the bird feed placed thereon even under the action of wind blowing against the feeder.

A still further object of the invention is to provide individual bird feeders which retain bird feed placed thereon despite the pecking, scratching, and other feeding actions of birds feeding on the feed surface thereof. In this manner, no feed is knocked to the ground which is both uneconomical and attracts rodents.

A yet further object is to reduce wasted bird seed by providing mechanical obstacles to the movement of bird feed from the feeding surface.

Yet another further object of the invention is to provide for individual bird feeders which drain away accumulated water so that bird feed placed thereon remains relatively dry and consumable.

Another object of the invention is to provide bird feeders of various colors for attracting different species of birds, for enhancing the visual effect of the bird feeders, especially when the bird feeders are moved, and thereby enhancing the educational value of the invention by providing more birds, and a more interesting feeding arrangement for encouraging the viewers to observe the feeders and birds for a longer period of time.

A still further object of the invention is to provide individual bird feeders which are readily detachable from the remainder of the bird feeding system so as to allow for easy cleaning thereof for the enhancement of the attractiveness of the individual bird feeders as feeding sites for birds, and for reducing the spread of avian diseases thanks to the ease of maintaining good hygiene of the bird feeders.

In summary, therefore, this invention is directed to a bird feeding system which can feed a variety of birds at the same time, prevents rodents from eating the bird feed, avoids spillage of bird feed both under windy conditions and owing to the "messy" feeding habits of birds using the system, and increases hygiene for reducing the spread of avian diseases. The bird feeding system also prevents the accumulation of water thereby keeping the bird feed fresh, is easy for a user to assemble and disassemble, and is inexpensive to manufacture.

These and other objects and advantages of the invention will be readily apparent in view of the following description and drawings of the above described invention.

BRIEF DESCRIPTION OF THE DRAWINGS

FIG. 1 is a perspective view showing the assembled bird feeding system of the type having three bird feeders, ready for use;

FIG. 2 is an enlarged view of one of the bird feeders of the bird feeding system shown in FIG. 1;

FIG. 3 is a sectional view of the bird feeder taken along line 3—3 of FIG. 2;

FIG. 4 is an enlarged view of one of the spacing members for establishing the fixed distance between adjacent ones of the bird feeders of the bird feeding system of FIG. 1;

FIG. 5 is an enlarged view of an alternative embodiment of a clamping member similar to FIG. 4;

FIG. 6 is a schematic view of a prior art bird feeder in which a moved position of the feeder under the influence of wind is shown in broken lines; and FIG. 7 is a schematic view of one of the bird feeders used in the bird feeding system of FIG. 1 shown under the influence of wind in a manner similar to FIG. 6.

DETAILED DESCRIPTION OF THE INVENTION

The bird feeding system according to the invention will now be described with specificity. Turning to FIG. 1, a bird feeding system S includes at least two bird feeders F supported by and spaced apart along an elongated support 10. Dimension lines p and q indicate a distance a corresponding, in this preferred embodiment of bird feeder F, to the diameter of bird feeder F. Dimension lines q and r, and dimension lines s and t, designate a distance b between adjacent ones of bird feeders F.

Through extensive experimentation with various spacings between adjacent bird feeders F, it has been found that when distance b is set to have a substantially horizontal component of about 2 feet, birds of different species will use adjacent ones of bird feeders F at the same time. Distance a corresponding to the width of bird feeder F is preferably about 12 inches (1 foot). Spacing members M are disposed on elongated support 10 and determine the fixed spacing between bird feeders F. Given that the preferred distance b between adjacent bird feeders F for attracting various species of birds to the respective feeders has been found to be 2 feet, it will be readily apparent that fixed distances c and d, as determined by respective pairs of dimension lines x and y, and y and z, respectively, will have a substantially horizontal component of about 3 feet.

Bird feeders F may have configurations other than the circular configurations shown in FIG. 1, as long as preferred fixed distance b between adjacent feeders F is maintained. The circular configurations of the bird feeders F are preferred, given that any orientation of circular bird feeders F, on assembly of feeding system S, has little or no effect on the desired spacing between adjacent bird feeders F.

FIG. 2 shows one of bird feeders F of FIG. 1 on an enlarged scale. Bird feeder F includes a main body 20, a bird feed receiving surface 22, and a wall 24 attached to bird feed receiving surface 22 and extending around an outer periphery thereof. There are attaching holes 26 formed in wall 24 at spaced apart intervals for receiving an end of attaching member 28 therethrough. A plurality of circular, upwardly extending ridges 32 is provided in the center of bird feeder main body 20. In a preferred embodiment an outermost one of the circular ridges 32 has a diameter of about 4.5 inches, a height of wall 24 is about 1 (one) inch. 0.5 inches above surface 22 and 0.5 inches below surface 22, and the diameter of main body 20 is about 12 inches. Attaching member 28 may be a nylon string or other strong, yet flexible, material.

As shown in FIG. 3, which is a sectional view taken along lines III—III of the bird feeder F of FIG. 2, an enlarged portion 30, such as a knot, retains attaching member 28 relative to wall 24. In order to reduce spoilage of bird food placed on bird feed receiving surface 22, drain holes 34 are provided at a plurality of locations in and extending through bird feed receiving surface 22. Drain holes 34 are likewise disposed in bird feed receiving surface 22 within an area bounded by ridges 32 and in the area between ridges 32 and wall 24. In an alternative embodiment (not shown) drain holes 34 may be eliminated so that bird feeder F can retain water and serve as a bird watering device.

Turning to FIG. 4, spacing member M for establishing the predetermined fixed distance between adjacent ones of bird feeders F, is shown on an enlarged scale. Each spacing member M includes a loop 42 defined by overlapping closely spaced apart portions of elongated support 10 so that a substantially circular looped section is formed, and which looped section is held in a fixed configuration by a clamp 44. A freely movable ring 46, such as a so-called snap ring, encircles a portion of loop 42.

A detachable hook member 50 is attached to attaching member 28 and is removably attached to ring 46 by means of a quick-release clip 52 at one end thereof. At the opposite end of quick-release clip 52 a swivel member 53 is movably attached for providing a rotatable connection between attaching members 28 and spacing member M. This swivel member 53 includes an eyelet 54 and an enlarged end 56 for rotatably retaining a swivel hook 58. Swivel hook 58 comprises a swivel hook eyelet 60 at a first end thereof and, at an opposite end, a retaining member 62 which encircles enlarged end 56. A clamp 64 surrounds common segments of attaching members 28 so that a pair of members 28 may be clamped by clamp 64 which prevents threading or shifting of members 28 relative to eyelet 60.

FIG. 5 shows a variant of the spacing member M, in which a loop 42' is fixedly retained by a clamp 44' having a plurality of inwardly extending gripping members 68. Gripping members 68 are manufactured, for example, in a manner well known in the art, such as by stamping holes in clamp 44' while leaving pieces of material pushed away from the main part of clamp 44' during the stamping process that serve as gripping members which engage the exterior of elongated support 10 when clamp 44' is clamped onto and fixes loop 42'. In other respects loop 42' functions in a manner similar to loop 42.

FIG. 6 shows a PRIOR ART bird feeder P having a known bird feed supporting tray 70 attached by relatively rigid elongated members 72 at rotatable swivel point 74. As can be seen, wind W causes feeding tray 70 to rotate relative to point 74 at a fixed distance therefrom established by rigid connecting members 72. As a result, known bird feeder P rotates clockwise as shown in FIG. 6 causing bird feed Q to fall off feeding tray 70 and onto the ground (not shown) where squirrels and other unwanted rodents can eat the bird feed intended for attracting birds.

FIG. 7 shows the bird feeder F according to the present invention subjected to the same wind W as shown acting on the prior art bird feeder P in FIG. 6. Owing to the physical characteristics of flexible attaching members 28, bird feeder main body 20, although it moves upwardly and laterally to the left as shown in FIG. 7, maintains a position substantially parallel to its initial, undeflected position. In this manner, no bird feed is lost from bird feed receiving surface 22 of bird feeder F. Main body 20 has a weight in the range of about 9.5 to 12.5 ounces, and preferably around 11 ounces. The weight of feeder F is critical as it must be sufficiently large so as to prevent tipping when larger birds land thereon, and so as to provide sufficient resistance to tipping under the influence of wind, yet be not so heavy as to cause elongated member 10 to sag, thereby reducing the necessary predetermined distance 6 between adjacent bird feeders F. Hence, the ratio of the weight to the size of bird feeder F is important. It is likewise critical that the size (i.e., diameter) of elongated member 10 not be increase to accommodate a feeder F heavier than the desired weight, as the increased diameter of elongated member 10 would allow for the movement of rodents therealong, thus gaining access to the bird feed on feeder F.

Each bird feeder main body 20 is colored one of the primary colors, blue, red, or yellow. Main body 20 may be painted with a known coating, or, preferably, main body 20 may be manufactured from high density polyethylene (HDPE) to which a colorant has been added in a manner known to those skilled in the plastics molding art. The provision of color is believed to attract birds, and to heighten the viewer's interest, causing the viewer to look at the feeders and birds for a longer period of time, thereby enhancing the educational value the system. Elongated support 10 is preferably a braided steel wire having a plastic, non-corrosive, slippery coating thereon, so-called aviation wire; alternatively, elongated support 10 comprises a single nylon strand, having a diameter of about 2 mm. In both preferred embodiments of elongated support member 10, clamps 44 and 44' compress and engage the plastic coating and nylon, respectively.

When the elongated support member is a wire having a plastic coating, the diameter is preferably about at most 2.4 mm; i.e., sufficiently small for preventing squirrels and other rodents from moving along the wire. When the elongated support member is a nylon strand, the diameter is preferably about at most 2 mm. The attaching members may be made of two nylon strings, each nylon string having a diameter of substantially 2.5 mm.

OPERATION

The use the present bird feeding system S, a user attaches elongated support 10 at its free ends 12, 14 to a support such as a tree, post, or building (not shown). Elongated support 10 is attached sufficiently tautly so that the desired, predetermined spacing between spacing members M at distances c and d is maintained, and so that a horizontal distance between outermost spacing members M and the supporting trees or posts is about 8.5 feet, whereby the horizontal distance between the supporting trees or posts and outermost feeders F is about 8 feet. Each bird feeder F is then attached by its respective hook member 50 to one of spacing members M. Attachment is made by attaching quick-release hook 52 in a known manner to ring 46, or by attaching hook 52 directly to loop 42 if no ring 46 is provided.

The user then checks to determine that the predetermined desired spacing established by distances b between adjacent bird feeders F has been maintained. If the weight of bird feeders F causes elongated support 10 to sag, then the user simply reestablishes the connection between one or both of free ends 12, 14, thus tightening elongated support 10, and retightening, if necessary, until the desired distances b are established. Bird food, such as mixed bird seed, is placed on bird feed receiving surface 22 of each bird feeder F. Preferably, only a quantity of bird food sufficient for one day's feeding is provided for maintaining freshness of the bird food. When bird feeder F, and especially bird feed receiving surface 22 and walls 24 become soiled with dirt and bird droppings, bird feeder F is readily detached from spacing member M by detaching quick-release hook 52 from loop 42, after which bird feeder F is thoroughly cleaned for reducing the transmission of avian diseases from one bird to another.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

I claim:

1. A bird feeder system for attracting and feeding a variety of bird species at the same time, comprising:
    a) an elongated support means having first and second spaced opposed ends;
    b) a means for fixedly spacing apart at least two bird feeders along the length of said elongated support means, said spacing means establishing a predetermined fixed distance between adjacent ones of the at least two bird feeders;
    c) at least two bird feeders disposed adjacent elongated support means, each said bird feeder being fixedly attached at said predetermined fixed distance from adjacent ones of said at least two bird feeders;
    d) attaching means for flexibly and fixedly attaching each said bird feeder of said at least two bird feeders to said elongated support means at said predetermined fixed distance from adjacent ones of said at least two bird feeders;
    e) each one of said at least two bird feeders includes a main body for supporting bird food on a top surface thereof;
    f) said main body includes a central portion and an outer perimeter;
    g) a wall means extends around said outer perimeter of said main body for retaining bird food on said main body and for serving as a landing surface for different species of birds when said system is in use;
    h) said top surface is sloped downwardly and inwardly from said outer perimeter to said central portion for restricting movement of bird food placed on said top surface; and
    i) whereby, said predetermined fixed distance between adjacent ones of said at least two bird feeders established by said spacing means is selected to have a length sufficiently long so that a variety of bird species will be attracted to and feed at said bird feeder system at the same time, one bird species or a plurality of compatible bird species feeding at one of said at least two bird feeders while, at the same time, a bird species different from the one or plurality of compatible bird species at the one of said at least two bird feeders feeds at an adjacent tone of said at least two bird feeders.

2. The bird feeder system as defined in claim 1, wherein:
    a) said elongated support means comprises a wire having a plastic coating; and
    b) a diameter of said wire and plastic coating is sufficiently small for preventing squirrels and other rodents from moving along said wire.

3. The bird feeder system as defined in claim 2, wherein:
    a) said diameter is at most 2.4 mm.

4. The bird feeder system as defined in claim 2, wherein:
    a) said spacing means comprises fixed loops defined in said wire;
    b) each said fixed loop includes a looped portion of said wire;
    c) said looped portion of wire includes a first portion of wire overlapping a second portion of wire and defining a loop between the first and second overlapping portions;
    d) a wire clamp is disposed at each said fixed loop;
    e) said wire clamp includes a substantially flat body and a plurality of protrusions extending inwardly from said body; and
    f) whereby, when said wire clamp is pressed against said looped portion of wire, said plurality of protrusions engage at least one of said plastic coating and said wire, thereby preventing said first and second overlapping portions from moving relative to each other for establishing each said fixed loop.

5. The bird feeder system as defined in claim 1, wherein:
    a) said attaching means includes a plurality of flexible elongated members, each said elongated member being sufficiently flexible for bending when wind blows against said at least two bird feeders attached thereto, thereby causing the bird feeders to maintain substantially the same orientation in the presence of and in the absence of wind.

6. The bird feeder system as defined in claim 5, wherein:
    a) said plurality of flexible, elongated members comprise two nylon strings; and
    b) each said nylon string has a diameter of substantially 2.5 mm.

7. The bird feeder system as defined in claim 1, wherein said elongated support means comprises:
    a) a nylon strand having a diameter of about 2 mm.

8. The bird feeder system as defined in claim 1, wherein:
    a) said main body is substantially circular; and
    b) a plurality of circular ridges is disposed in said central portion of said top surface, said circular ridges restricting movement of bird food placed on said top surface.

9. The bird feeder system as defined in claim 1, wherein:
    a) said main body includes means for defining a plurality of holes in said main body for draining liquids disposed on said top surface away therefrom.

10. The bird feeder system as defined in claim 8, wherein:
    a) said attaching means includes a plurality of flexible elongated members, each said elongated member being sufficiently flexible for bending when wind blows against said at least two bird feeders attached thereto, thereby causing the bird feeders to maintain substantially the same orientation in the presence of and in the absence of wind;
    b) said wall means includes a means for defining a plurality of attaching holes through said wall means;
    c) each said elongated member extends through one of said plurality of attaching holes; and
    d) an enlarged portion is disposed at a first end of each said elongated member, said enlarged portion being larger than each said attaching hole for retaining said elongated member relative to said wall means.

11. The bird feeder system as defined in claim 10, wherein:
    a) each one of said plurality of flexible elongated members comprises a nylon string.

12. The bird feeder system as defined in claim 11, wherein:
    a) each said nylon string includes a second end distant from said first end;

b) said attaching means includes a spring-loaded hook member fixedly attached to each said nylon string; and c) said spring-loaded hook member is detachably attached to said elongated support means.

13. The bird feeder system as defined in claim 1, wherein:

a) each one of said at least two bird feeders includes a main body;

b) said main body has a top surface for receiving bird food thereon; and c) said length of said predetermined fixed distance between adjacent ones of said bird feeders has a substantially horizontal component of about two feet.

14. The bird feeder system as defined in claim 13, wherein:

a) said main body is substantially circular;

b) a diameter of said main body is substantially one foot;

c) said main body has a weight of substantially 11 ounces; and d) said main body comprises high density polyethylene.

15. The bird feeder system as defined in claim 14, wherein:

a) said main body has a predetermined color selected from a group consisting of the primary colors red, blue, and yellow; and b) whereby said predetermined color heightens a viewer's interest for causing a viewer to look at said at least two bird feeders and any birds thereon for a longer period of time, thereby enhancing the educational value of said bird feeder system.

16. A bird feeder for preventing loss of bird feed, comprising:

a) attaching means for flexibly attaching said bird feeder to a support;

b) said attaching means includes a plurality of flexible elongated members, each said elongated member being sufficiently flexible for bending when wind blows against said bird feeder attached thereto, thereby causing the bird feeder to maintain substantially the same orientation in the presence of and in the absence of wind;

c) said bird feeder includes a main body for supporting bird food on a top surface thereof;

d) said main body is substantially circular;

e) said main body includes a central portion and an outer perimeter;

f) a plurality of circular ridges is disposed in said central portion of said top surface, said circular ridges restricting movement of bird food placed on said top surface;

g) a wall means extends around said outer perimeter of said main body for retaining bird food on said main body and for serving as a landing surface for different species of birds when said feeder is in use; and h) said top surface is sloped downwardly and inwardly from said outer perimeter to said central portion for restricting movement of bird food placed on said top surface.

17. The bird feeder system as defined in claim 16, wherein:

a) said main body has a diameter of substantially 12 inches;

b) an outermost one of said plurality of circular ridges has a diameter of about 4.5 inches; and c) a height of said wall means is substantially ½ inch above said central portion and ½ inch below.

18. A bird feeder system for attracting and feed a variety of bird species at the same time, comprising:

a) an elongated support means having first and second spaced opposed ends;

b) a means for fixedly spacing apart at least two bird feeders along the length of said elongated support means, said spacing means establishing a predetermined fixed distance between adjacent ones of the at least two bird feeders;

c) said elongated support means comprises an elongated support member;

d) said spacing means comprises fixed loops defined in said elongated support member;

e) each said fixed loop includes a looped portion of said elongated support member;

f) said looped portion of said elongated support member includes a first portion of said elongated support member overlapping a second portion of said elongated support member and defining a loop between the first and second overlapping portions;

g) a wire clamp is disposed at each said fixed loop;

h) said wire clamp includes a substantially flat body and a plurality of protrusions extending inwardly from said body;

i) whereby, when said wire clamp is pressed against said looped portion of said elongated support member, said plurality of protrusions engage said elongated support member, thereby preventing said first and second overlapping portions from moving relative to each other for establishing each said fixed loop;

j) at least two bird feeders disposed adjacent said elongated support member, each said bird feeder being at said predetermined fixed distance from adjacent ones of said at least two bird feeders;

k) attaching means for flexibly attaching each said bird feeder of said at least two bird feeders to said elongated support member; and l) whereby, said predetermined fixed distance between adjacent ones of said at least two bird feeders established by said spacing means is selected to have a length sufficiently long so that a variety of bird species will be attracted to and feed at said bird feeder system at the same time, one bird species or a plurality of compatible bird species feeding at one of said at least two bird feeders while, at the same time, a bird species different from the one or plurality of compatible bird species at the one of said at least two bird feeders feeds at an adjacent one of said at least two bird feeders.

19. The bird feeder system as defined in claim 18, wherein;

a) said attaching means includes a plurality of flexible elongated members, each said elongated member being sufficiently flexible for bending when wind blows against said at least two bird feeders attached thereto, thereby causing the bird feeders to maintain substantially the same orientation in the presence of and in the absence of wind.

* * * * *